UNITED STATES PATENT OFFICE.

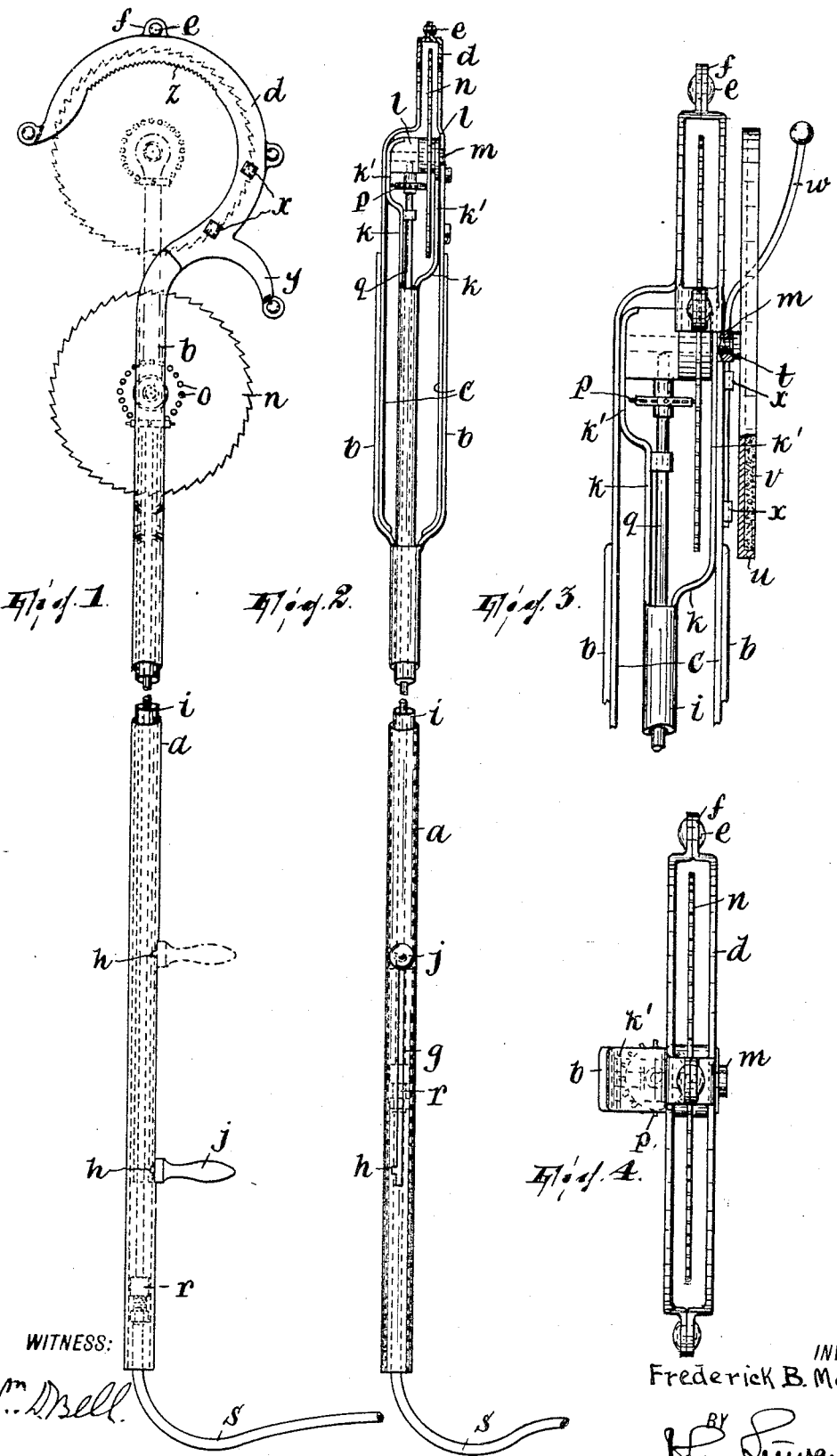

FREDERICK B. MARVIN, OF NEW YORK, N. Y.

TREE-SURGERY IMPLEMENT.

1,251,554.  Specification of Letters Patent.  Patented Jan. 1, 1918.

Application filed April 24, 1916. Serial No. 93,039.

*To all whom it may concern:*

Be it known that I, FREDERICK B. MARVIN, a citizen of the United States, residing at New York city, in the county of New York and State of New York, have invented certain new and useful Improvements in Tree-Surgery Implements, of which the following is a specification.

The object of this invention is to provide an implement for use in tree surgery and other operations requiring sawing, boring, polishing, and the like which shall be simple, compact, strong and durable in construction and highly efficient in operation.

One part of my invention consists in providing an elongated handle member in which slides longitudinally a carrier member for the movable parts of the device, the said members having novel features of construction adapting them for efficient coöperation with each other and the proper performance of the implement in actual operation.

Another part of my invention consists in providing the handle member with a rest or purchase extension, notably a hook or crook, whereby to facilitate certain operations to be performed by the implement, as for instance, sawing off a tree limb or polishing the sawed surface.

In the accompanying drawing in which my invention is fully illustrated,

Figure 1 is a side elevation of the improved implement;

Fig. 2 is a front elevation thereof, the hook-extension or crook being shown in section;

Fig. 3 is a front elevation, on a larger scale, of the upper portion of the implement, and showing certain attachments in place; and, Fig. 4 is a top plan view.

In said drawings $a$ is an elongated tubular handle member which has at one end the fork $b$ and at the other affords a handle proper. Stiffening the members of this fork are the strips $c\,c$ riveted or otherwise secured to the inside surfaces thereof, the two strips being in side elevation formed as to their upper end portions in the shape of a hook or crook $d$, the two parts of which may be rigidly secured together by rivets $e$ passing through ears $f$ on the outer edges of the strips. The parts $b$, $c$ and $d$ of the device form a hook-extension on the handle member $a$, and, it being remarked that the hook or crook proper preferably conforms to more than half of a circle, it is preferable that the center around which the hook or crook is formed shall be substantially coincident with the longitudinal axis of the handle proper of the member $a$. The members of the fork $b$, with so much of the strips $c$ as are in immediate contact therewith, form a guiding portion, as will be hereinafter explained, which extends parallel with the axis of the handle proper of member $a$. In said handle proper of member $a$ is a longitudinal slot $g$ formed with offset notches $h$ at the ends thereof.

Snugly fitting the handle proper of member $a$ is a tubular carrier $i$ having a handle $j$ projecting through the slot $g$ and affording means for moving the carrier $i$ longitudinally in member $a$. The upper end of the carrier consist of elongated strips $k$ forming extensions of the carrier and each having a flat straight portion $k'$ which bears against one of the portions $c$ and serves to guide and confine the upper end of the carrier. The free ends of the extensions are equipped with bearings $l$ for a shaft $m$ on which as a holder, between said bearings, is fixed a circular blade $n$ having a serrated edge and thus forming a saw. The saw is formed with a circular series of holes $o$ with which engage the teeth on the periphery of a pinion $p$ secured on the upper end of a shaft $q$ suitably journaled in the carrier and extending therethrough and having means $r$ at its lower end for coupling it with a flexible shaft $s$ which may be rotated from any suitable motor. The saw blade $n$ is sufficiently greater in diameter than the hook or crook $d$ so that when the carrier is elevated to its upward limit the periphery of the saw is for the greater portion thereof sheathed by the two sides of said hook or crook, as indicated by dotted lines in Fig. 1.

The shaft $m$ may have a threaded bore at one end to receive the threaded spindle $t$ of another tool, such as a tool for smoothing the sawed face of a tree limb, a boring tool, a tool for burring or reaming out the decayed cavities, and other devices; one of these—a tool for smoothing off the sawed surface of a tree limb—is shown, the same being a disk $u$ having an abrading face $v$. In connection with the tools used in this way it may be desired to steady the implement at its upper end against the tree while the tool is operating, wherefore I provide the removable arm $w$ arranged in the sockets $x$ on the side of the crook $d$.

The hook-extension of the implement preferably has the hook $y$, whereby it may be temporarily hung up when not actually in use, as on the limb of a tree.

In using the implement, when a limb is to be sawed off the hook-extension, which is serrated at $z$, is hooked over the limb so as to obtain a purchase. The blade $n$ being now set in rotation by rotating the flexible shaft $s$ and consequently shaft $q$ and pinion $p$, the operator, holding the handle member $a$ in one hand and grasping the handle $j$ with the other, gradually raises the carrier $i$ in the handle to advance the saw against and through the limb. This operation is greatly facilitated, as will be obvious, because of the purchase afforded by the hook-extension.

The manner of using the implement when one of the other tools, as $v$, is in service has been already explained.

In this connection it should be noted that one of the important features of the implement is the fact that the carrier member may be moved back and forth in the handle member while the latter has a purchase against the work.

In order to sheath the saw blade $n$ within the hook-extension (dotted position, Fig. 1) the carrier is elevated and then turned so that the handle $j$ engages in the upper notch $h$.

Having thus fully described my invention, what I claim as new and desire to secure by Letters Patent is:—

1. In combination, an elongated handle member, the same having at one end a handle proper and in its other end-portion a rest-extension adapted to bear against and afford a purchase for the implement against the tree or the like being operated upon, a hand-moved carrier member slidable in and longitudinally of the handle member, and having a handle adjacent the handle proper of the handle member and a train of moving parts arranged in the carrier member and including a tool holder.

2. In combination, an elongated handle member, the same having at one end a handle proper and in its other end-portion a hook-extension adapted to hook over and bear against the tree limb or the like being operated upon, a hand-moved carrier member slidable in and longitudinally of the handle member toward and from the hook-extension, and having a handle adjacent the handle proper of the handle member and a train of moving parts arranged in the carrier member and including a tool holder.

3. In combination, an elongated handle member, the same having at one end a handle proper and in its other end-portion a hook extension adapted to hook over and bear against the tree limb or the like being operated upon, a hand-moved carrier member slidable in and longitudinally of the handle member toward and from the hook-extension, and having a handle adjacent the handle proper of the handle member and a train of moving parts arranged in the carrier member and including a tool holder and a blade, the latter being arranged in a plane substantially coincident with that of said hook-extension.

4. In combination, a handle member including an elongated handle and a forked guiding portion substantially parallel with the longitudinal axis of said handle, a carrier member longitudinally slidable in and guided by said handle and having a guiding portion between and in guiding contact with the guiding arms of said forked portion of the handle member, and a train of moving parts arranged in the carrier member and including a tool holder.

5. In combination, an elongated handle member having a forked guiding portion substantially parallel with its longitudinal axis, said portion terminating in a rest-extension adapted to bear against and afford a purchase for the implement against the tree or the like being operated upon, a carrier member longitudinally slidable in said handle member and having a guiding portion between and in guiding contact with the arms of said forked guiding portion of the handle member, and a train of moving parts arranged in the carrier member and including a tool holder.

In testimony whereof I affix my signature.

FREDERICK B. MARVIN.